United States Patent
Danielson et al.

(10) Patent No.: US 6,504,684 B1
(45) Date of Patent: Jan. 7, 2003

(54) HEAD SUSPENSION WITH INTEGRAL SHOCK LIMITER

(75) Inventors: Reid C. Danielson, Cokato, MN (US); Catherine A. Morley, Lester Prairie, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 09/472,480

(22) Filed: Dec. 27, 1999

(51) Int. Cl.$^7$ .............................. G11B 21/16; G11B 5/55
(52) U.S. Cl. .................................................. 360/244.8
(58) Field of Search .......................... 360/245.7, 245.3, 360/244.2, 244.8, 245, 244, 240, 244.9, 244.5

(56) References Cited

U.S. PATENT DOCUMENTS

| | | | |
|---|---|---|---|
| 4,724,500 A | 2/1988 | Dalziel | 360/245.7 |
| 5,012,369 A | 4/1991 | Owe et al. | 360/294.7 |
| 5,333,085 A | 7/1994 | Prentice et al. | 360/245.7 |
| 5,422,770 A | 6/1995 | Alt | 360/244.2 |
| 5,446,612 A | 8/1995 | Thornton et al. | 360/244.9 |
| 5,526,205 A | 6/1996 | Aoyagi et al. | 360/244.2 |
| 5,535,075 A | 7/1996 | Takahashi et al. | 369/256 |
| 5,657,300 A * | 8/1997 | Takahashi | 369/13.17 |
| 5,771,136 A * | 6/1998 | Girard | 360/245.7 |
| 5,808,837 A | 9/1998 | Norton | 360/254.3 |
| 5,815,349 A | 9/1998 | Frater | |
| 5,831,793 A | 11/1998 | Resh | |
| 5,877,920 A | 3/1999 | Resh | |
| 5,914,835 A | 6/1999 | Girard et al. | |
| 5,926,347 A | 7/1999 | Kouhei et al. | |
| 5,936,803 A | 8/1999 | Berding | |
| 5,936,804 A | 8/1999 | Riener et al. | |
| 5,949,617 A | 9/1999 | Zhu | |
| 5,973,884 A | 10/1999 | Hagen | |
| 5,987,733 A * | 11/1999 | Goss | 29/603.03 |
| 6,181,525 B1 * | 1/2001 | Carlson | 360/245.7 |
| 6,233,121 B1 * | 5/2001 | Pan | 360/245.7 |
| 6,304,420 B1 * | 10/2001 | Murphy et al. | 360/245.7 |
| 6,351,350 B1 * | 2/2002 | Symons et al. | 360/244.9 |

FOREIGN PATENT DOCUMENTS

| | | |
|---|---|---|
| JP | 9-223759 | 8/1997 |
| JP | 9-282823 | 10/1997 |
| JP | 10-69743 | 3/1998 |
| JP | 10-241310 | 9/1998 |
| JP | 11-53855 | 2/1999 |
| JP | 11-66522 | 3/1999 |
| JP | 11-66766 | 3/1999 |
| JP | 11-213581 | 8/1999 |
| KR | 98-4659 | 3/1998 |
| WO | WO 99/27533 | 6/1999 |
| WO | WO 00/30078 | 5/2000 |

\* cited by examiner

*Primary Examiner*—Robert S. Tupper
*Assistant Examiner*—Julie Anne Watko
(74) *Attorney, Agent, or Firm*—Faegre & Benson LLP

(57) ABSTRACT

A head suspension for supporting a head slider relative to a rotating disk in a rigid disk drive, formed from a flexure and a load beam that has a mounting region, a rigid region and a spring region located between the mounting and rigid regions. The load beam including a shock limiter integrally formed within the spring region as a cantilevered portion surrounded by a spring aperture used for adjusting the spring stiffness of the spring region. The head suspension typically configured to include a bend or radius in the spring region to bias the head suspension toward the disk surface. The cantilevered portion of the shock limiter formed with a pre-determined gap between the shock limiter and the head suspension when the head suspension is in an operating position. The cantilevered portion configured to overlap a portion of the head suspension, such that movement of the head suspension toward the shock limiter due to impact or shock loading results in contact between the shock limiter and the overlapped portion, thereby arresting the movement of the head suspension.

9 Claims, 15 Drawing Sheets

HEAD SUSPENSION WITH INTEGRAL SHOCK LIMITER

FIELD OF THE INVENTION

The present invention is directed to a head suspension for supporting a head slider relative to a rotating disk in a rigid disk drive, and in particular, to a head suspension having a shock limiter integrally formed in the load beam.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk which is referred to as the "fly height."

Head suspensions for rigid disk drives include a load beam and a flexure. The load beam includes a mounting region at its proximal end for mounting the head suspension to an actuator of the disk drive, a rigid region, and a spring region between the mounting region and the rigid region for providing a spring force to counteract the aerodynamic lift force generated on the head slider during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

In one type of head suspension the flexure is formed as a separate piece having a load beam mounting region which is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam to the flexure, provides clearance between the flexure and the load beam, and serves as a point about which the head slider can gimbal in pitch and roll directions to follow fluctuations in the disk surface.

As disk drives are designed having smaller disks, closer spacing, and increased storage densities, smaller and thinner head suspensions are required. These smaller and thinner head suspensions are susceptible to damage if the disk drive is subjected to a shock load or if the suspension experiences excessive pitch and roll motion. Moreover, as the use of portable personal computers increases, it is more likely that head suspensions in these portable computers will be subjected to shock loads. Thus, it is becoming increasingly important to design the head suspension so that it is less susceptible to excessive movements caused by shock loads and by pitch and roll motion, while still maintaining the necessary freedom of movement in the pitch and roll directions. In this manner, damaging contact between the head slider and the disk surface and permanent deformation of components of the head suspension can be prevented.

Mechanisms have been developed for limiting the movement of a free end of a cantilever portion of a flexure for protection against damage under shock loads. One such mechanism is disclosed in U.S. Pat. No. 4,724,500 to Dalziel. The Dalziel reference describes a limiter structure comprising a head slider having raised shoulders to which one or more elements are secured. The elements on the head slider overlap at least a portion of a top surface of the load beam to which the flexure is attached.

Another motion limiter is disclosed in U.S. Pat. No. 5,333,085 to Prentice et al. The head suspension shown in Prentice includes a tab that extends from a free end of a cantilever portion of a flexure. The tab is fitted through an opening of the load beam to oppose the top surface of the load beam.

Another motion limiter is disclosed in U.S. Pat. No. 5,526,205 to Aoyagi et al. The Aoyagi reference discloses a head suspension having a perpendicular hook at an end of a flexure. The hook is shaped to engage a transverse appendage at the distal end of a load beam to prevent the end of the flexure from displacing vertically too great a distance from the load beam.

Yet another motion limiter is disclosed in U.S. Pat. No. 5,877,920 to Resh. The Resh reference discloses a head suspension assembly including a load beam, a recording head and a gimbal including a head mounting tab on which the recording head is mounted. A displacement limiter extends between the load beam and the gimbal for limiting vertical displacement of the gimbal in a direction toward the recording head relative to the load beam.

Additionally, mechanisms have been developed for limiting motion of the overall load beam relative to the disk. One such mechanism is shown in Japanese Patent No. 11-66766 to Kawazoe. The Kawazoe patent teaches a hard disk drive having a suspension including a lift prevention member formed in or attached to the mounting region of the load beam that prevents lifting of the flying head away from the hard disk due to an impact load. Another mechanism is shown in U.S. Pat. No. 5,808,837 to Norton. The Norton patent teaches a hard disk drive having a suspension arm and a separate limit stop to restrain movement of the suspension arm that is mounted adjacent the suspension arm. Other mechanisms for restraining suspension movement are shown in U.S. Pat. No. 5,936,804 to Riener et al., U.S. Pat. No. 5,926,347 to Kouhei et al., and U.S. Pat. No. 5,831,793 to Resh.

A need still exists, however, for an improved head suspension including a mechanism capable of limiting motion of the suspension away from the surface of the disk due to impact and shock loading. Such a mechanism should work within the requirements of hard disk drive suspensions, including overall weight limitations, height limitations, manufacturability and functionality.

SUMMARY OF THE INVENTION

The present invention meets the ongoing need for improved head suspensions by providing a head suspension that includes an integral shock limiter. The head suspension is typically formed from a flexure and a load beam that has a mounting region, a rigid region and a spring region located between the mounting and rigid regions. The load beam includes a shock limiter integrally formed within the spring region as a cantilevered portion surrounded by a spring aperture used for adjusting the spring stiffness of the spring region. The cantilevered portion is configured to overlap a portion of the head suspension, such as the flexure, a portion of the load beam or a base plate mounted to the load beam at the mounting region.

A bend or radius is typically formed into the spring region in order to bias the head suspension toward the disk surface. A cantilevered portion of the shock limiter is formed to allow for a pre-determined gap between the shock limiter and the overlapped portion of the head suspension, when the suspension is held in its operating position. This gap allows for slight movement vertically before the shock limiter is engaged. Upon movement of the head suspension away from the disk surface due to an impact load, the head suspension flexes about the spring region and the rigid region of the load beam moves away from the disk surface. As the head suspension moves farther away from the disk surface, the cantilevered portion contacts the overlapped portion of the head suspension, thereby arresting the movement of the head suspension and limiting damage to the disk drive. The cantilevered portion may be reconfigured by bending to achieve the overlap with the overlapped portion of the head suspension.

The present invention provides a head suspension including a shock limiter integrally formed in the spring region of the load beam for limiting movement of the head suspension away from the surface of the disk over which the head suspension is suspended. Use of such an integral shock limiter provides the advantage of simultaneous formation with a spring aperture used to adjust the stiffness of the spring region. In addition, such a shock limiter allows for minimization of weight and manufacturing steps by utilizing material and processes already present in the fabrication of the head suspension. Yet another benefit of the shock limiter of the present invention is the ability to minimize load loss due to back bending of the spring region radius formed to provide gram loading at the head slider to counteract aerodynamic lifting forces on the head slider. These numerous benefits, along with the function of the shock limiter, set the present invention apart as a significant improvement in head suspension design.

DETAILED DESCRIPTION OF THE INVENTION

Figure 1:
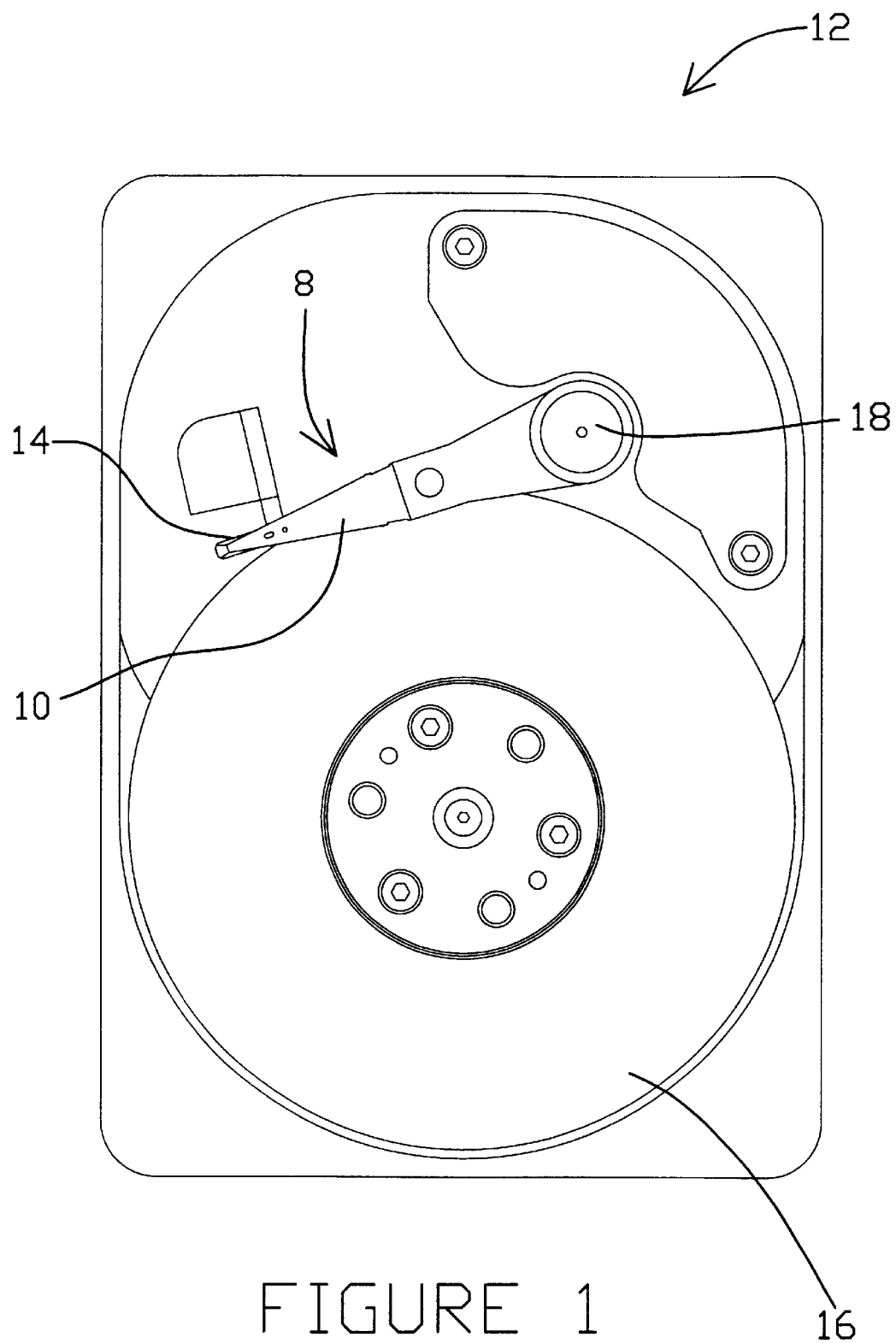
FIG. 1 a top plan view of a hard disk drive including a head suspension assembly.

With reference to the attached Figure, it is to be understood that like components are labeled with like numerals throughout the several Figures. FIG. 1 schematically illustrates a rigid disk drive 12 that includes a head suspension assembly 8. Head suspension assembly 8 resiliently supports a head slider 14 at a fly height above a rigid disk 16 during operation, as described above in the Background section. Head suspension assembly 8 is connected to a rotary actuator 18, as is known, for accessing data tracks provided on the surface of rigid disk 16. Head suspension assembly 8 could otherwise be utilized with a linear type actuator, as is also well known.

Figure 2:
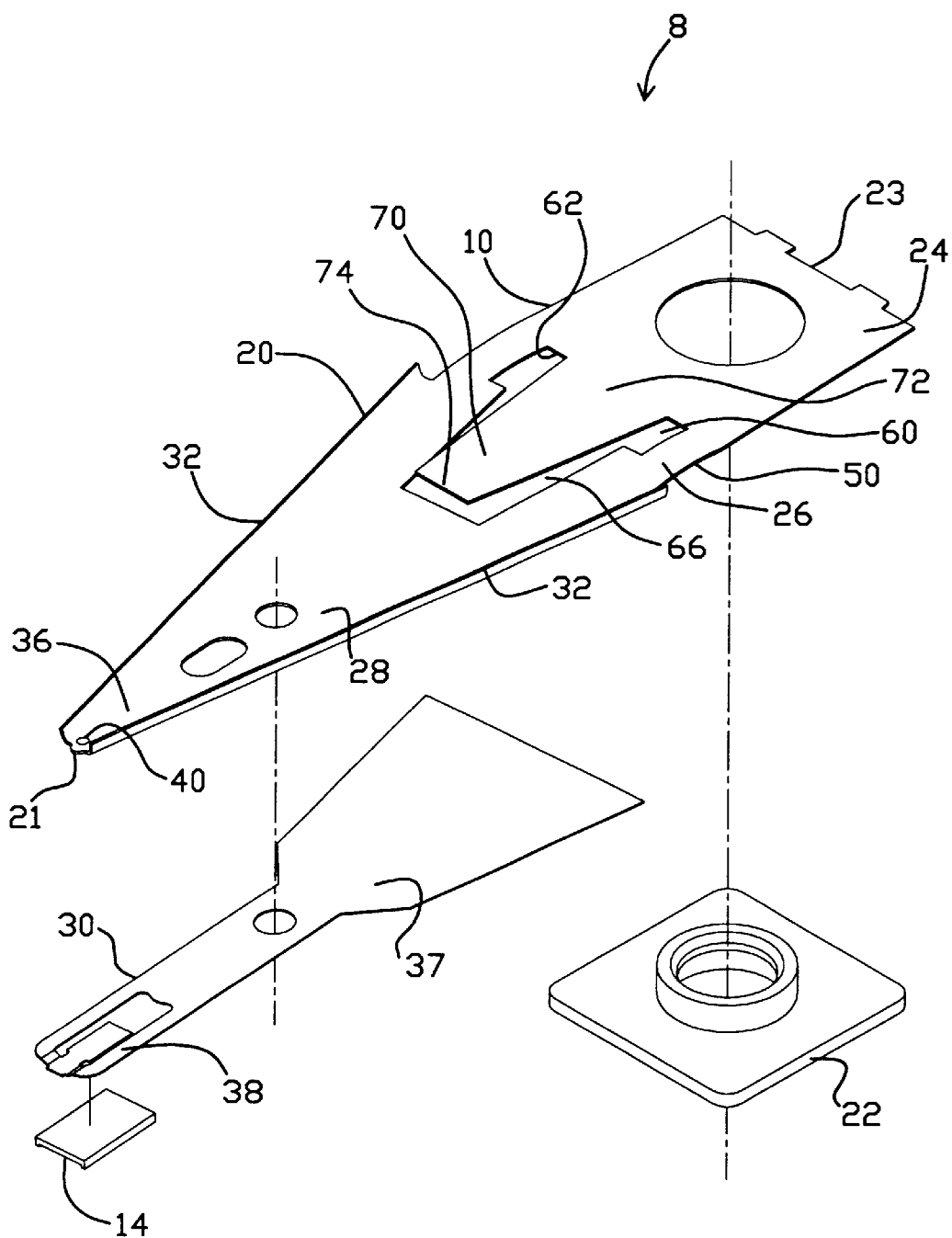
FIG. 2 is an exploded perspective view of the head suspension assembly of FIG. 1, including one embodiment of an integral shock limiter in accordance with the present invention.

FIG. 2 shows head suspension assembly 8 in greater detail. Head suspension assembly 8 includes head suspension 10 in accordance with the present invention, slider 14, and a base plate 22. Head suspension 10 includes a load beam 20 and a flexure 30. Base plate 22 can be conventionally fixed to an actuator mounting region 24 located at the proximal end 23 of the load beam 20, such as by welding. The load beam 20 has a rigid region 28, and a spring region 26 between the mounting region 24 and rigid region 28. The spring region 26 typically includes a bend or radius 50, and provides a load to the rigid region 28 with respect to mounting region 24. Rigid region 28 is provided with stiffening rails 32, as are well known, to enhance stiffness properties.

Figure 3:
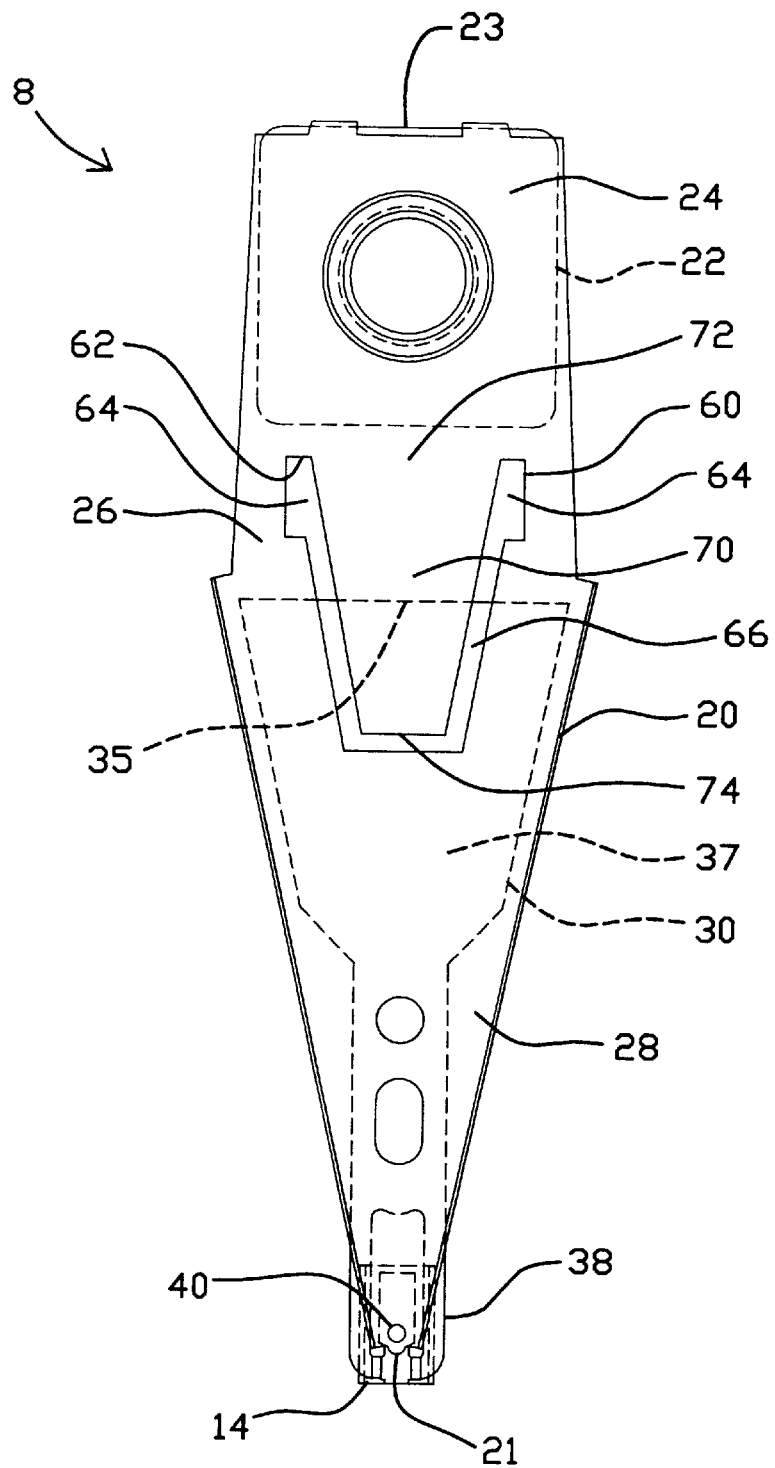
FIG. 3 is a top plan view of the head suspension shown in FIG. 2.

In the embodiment shown in FIGS. 2 and 3, the flexure 30 extends from the distal end 21 of load beam 20, is constructed as a separate element of head suspension 10, and is co-extensive with the rigid region 28 of the load beam 20. Flexure 30 comprises a load beam mounting region 37 and a gimbal region 38 and is generally co-planar to the load beam 20. The flexure 30 is secured to load beam 20 in a conventional manner, such as by welding load beam mounting region 73 to the rigid region 28 of the load beam 20.

Rigid region 28 of load beam 20 includes a load portion 36 at its distal end 21. Included in the load portion 36 is a load point 40 for transferring the load from load portion 36 to the gimbal region 38 of the flexure 30. The load point 40 may be formed extending from the load portion 36 of the load beam 20 toward gimbal region 38, or the load point 40 can be formed in gimbal region 38 to extend toward load portion 36 of load beam 20. The load point 40 may be formed as a dimple, using conventional methods such as a forming punch. Alternately, the load point 40 may be formed by other structure, including an etched tower, a glass ball, or an epoxy dome.

The spring region 26 of the load beam 20 provides a spring force load to the slider 14 through the flexure 30 at the distal end 21 of the load beam 20. This is typically accomplished through the pre-formed bend or radius 50 that is formed in a rotational direction for functionally biasing the slider 14 toward the surface of the disk 16 when the disk drive 12 is in use. The degree of the bend or radius 50 is determined by both the predetermined offset height of the slider 14 over the non-moving disk 16, and the gram load needed to counteract the aerodynamic lift force generated on the slider 14 when the slider 14 flies over the moving disk 16 and to produce a desired fly height of the slider 14 over the moving disk 16.

The spring region 26 may also include a spring aperture 60 used to adjust or tune spring characteristics (such as stiffness) of the spring region 26, and thus the gram loading, by removal of spring region material. Such adjustment of the spring stiffness has the added benefit of reducing the overall weight of the head suspension 10.

The spring region 26 is thus designed to provide a desired force toward the disk 16 to counteract a resulting aerodynamic lift force away from the disk 16. However, when the disk drive 12 is subjected to shock or impact loads, such as those due to dropping of the drive 12 or other impact, the head suspension may react by moving abruptly toward or away from the disk 16. Such movement may cause the head slider 14 to crash into the disk 16, and/or crash against other components within the disk drive 12. Either type of head slider contact may damage the head slider 14 and/or the disk drive 12. In addition, excessive movement of the head suspension 10 away from the disk 16, and thus in the opposite direction of the bend or radius 50, may cause permanent deformation of the bend or radius 50, thereby changing the gram loading associated with the bend or radius 50 and affecting the function of the drive 12. Such a change in the gram loading is typically known as "load loss."

In order to help prevent catastrophic contact of the head slider 14 due to impact loads, as well as prevent load loss, a shock limiter 70 is integrally formed within the spring region 26, in accordance with the present invention. In the embodiment shown in FIGS. 2 and 3, the shock limiter 70 is formed from the spring region material as an elongated cantilevered portion extending from a proximal edge 62 of the spring aperture 60. The shock limiter 70 connects to the spring region material at a proximal end 72 and extends toward the distal end 21 of the load beam 20 at a distal end 74. As shown in FIG. 3, the distal end 74 of the shock limiter 70 overlaps a proximal end 35 of the flexure 30.

The spring aperture 60 is formed around the shock limiter 70 in a generally 'U' shaped configuration. Since the spring aperture 60 is responsible for adjustment of the spring stiffness in the spring region 26, the size and shape of the spring aperture 60 around the shock limiter 70 may vary according to the spring force requirements of a particular head suspension 10. In the embodiment shown in FIG. 3, the spring aperture 60 includes a pair of larger openings 64 flanking the proximal end 72 of the shock limiter 70. The spring aperture 60 also includes an elongated portion 66 formed as a generally uniform gap around the sides and distal end 74 of the shock limiter 70, overlapping a portion of the proximal end 35 of the flexure 30, as well.

As shown in FIG. 2, the bend or radius 50 is formed in the spring region 26. The shock limiter 70 is formed to include a predetermined gap between the distal end 74 of the shock limiter 70 and the rigid region 28 of the load beans 20, when the head suspension 10 is in an operating position. When a shock load causes the head suspension 10 to move away from the disk 16, the head suspension 10 flexes about the spring region 26 and the rigid region 28 of the load beam 20 moves toward the shock limiter 70. As the head suspension 10 moves farther away from the disk 16, the overlapped portion 35 of the flexure 30 contacts the shock limiter 70, thus arresting the movement of the head suspension 10, thereby minimizing the effects of the shock load induced movement.

Integral formation of the shock limiter 70 within the spring region 26 results in both the spring aperture 60 and the shock limiter 70 being formed simultaneously, thus eliminating the need for additional manufacturing steps. Additionally, integral formation of the shock limiter 70 eliminates the need for additional material being mounted to the head suspension 10 in order to provide limitation of movement during a shock loading, thereby keeping the overall weight of the head suspension to a minimum.

Figure 4:
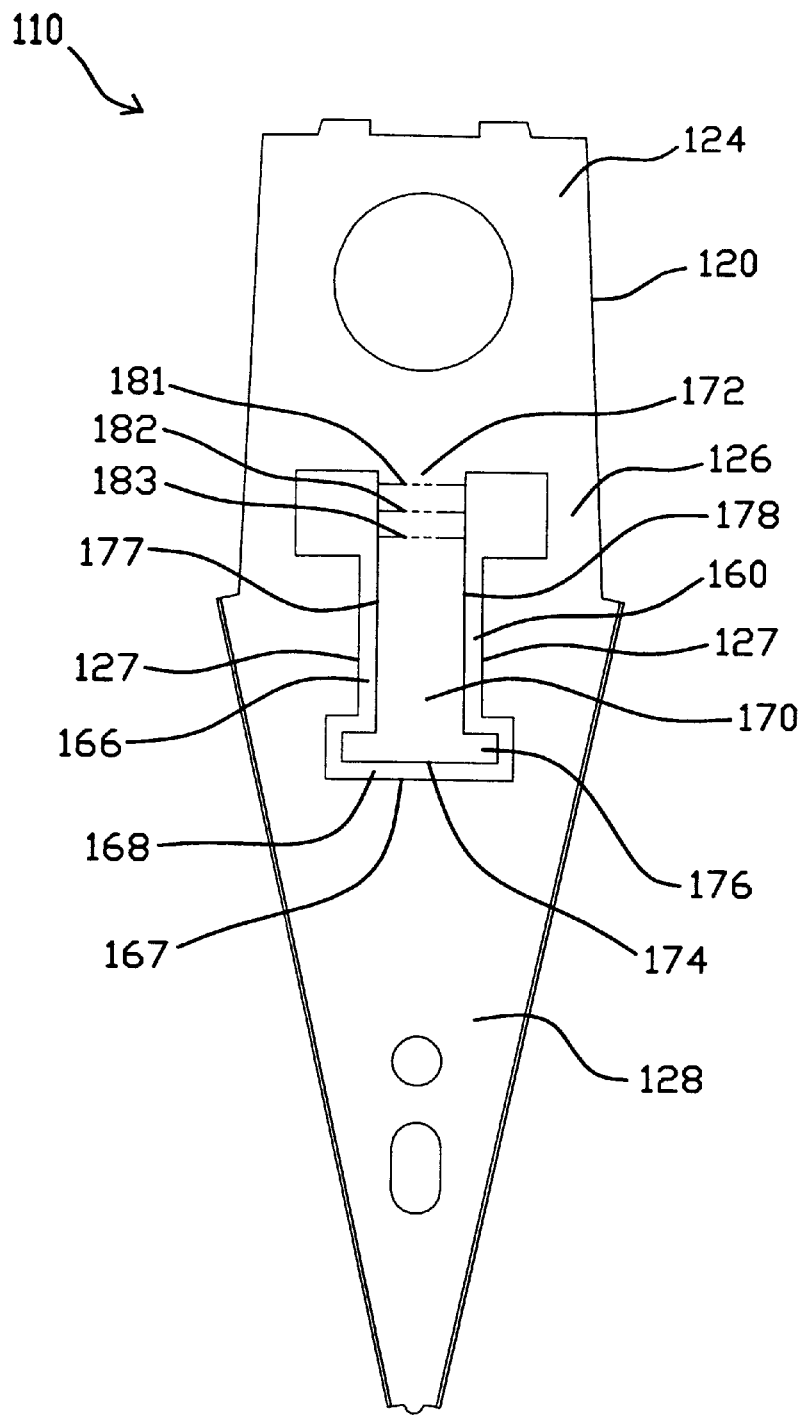
FIG. 4 is a top plan view of a head suspension including another embodiment of an integral shock limiter in accordance with the present invention.
Figure 5:
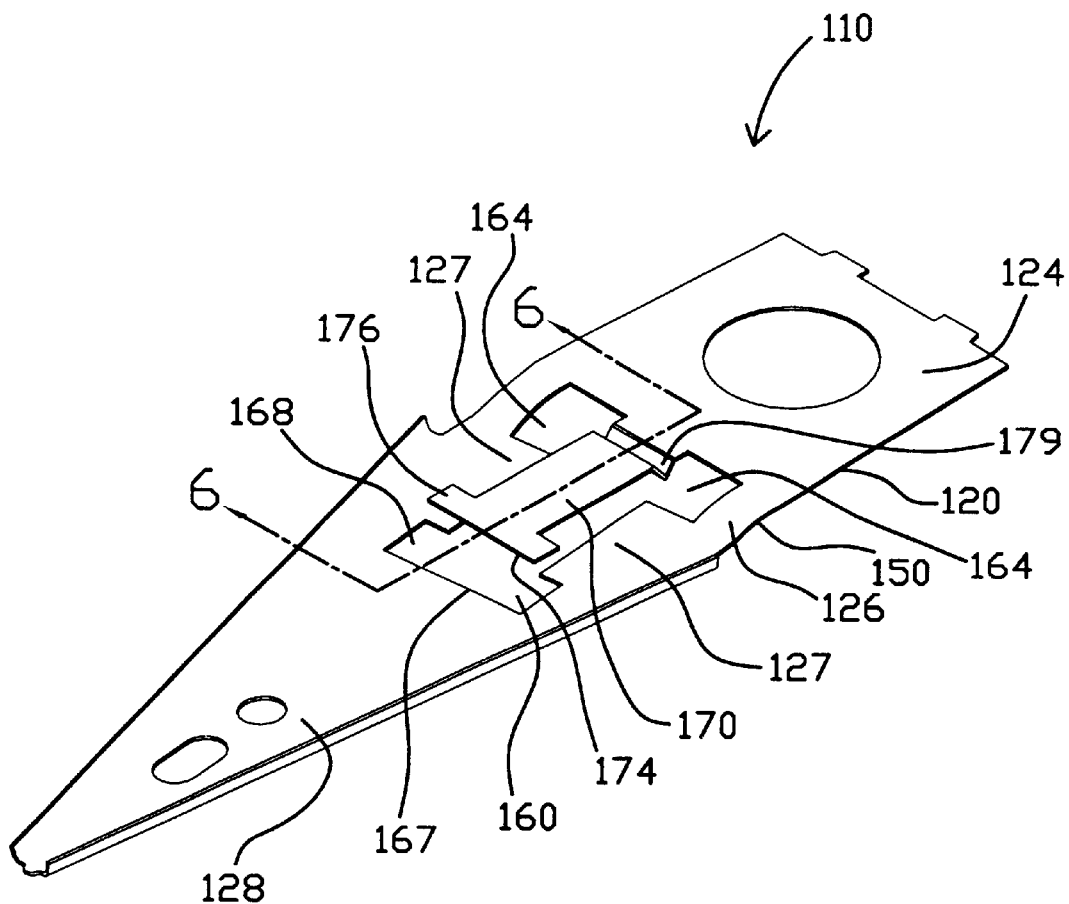
FIG. 5 is a perspective view of the head suspension of FIG. 4 after reconfiguration of the integral shock limiter.
Figure 6:
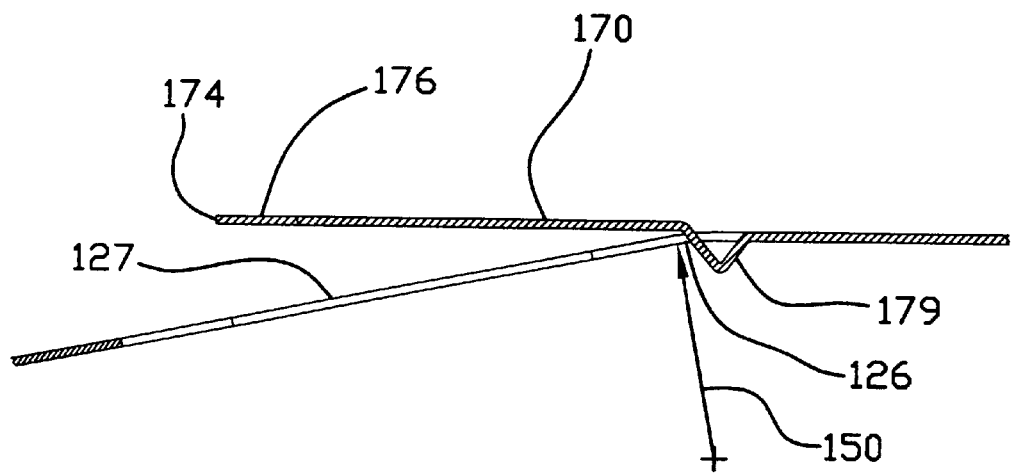
FIG. 6 is a cross-sectional side view of the head suspension of FIG. 5, taken along Line 6—6.

Referring now to FIGS. 4–6, in another embodiment of the present invention, a head suspension 110 is shown formed from a load beam 120 having a mounting region 124, a rigid region 128 and a spring region 126 located between the mounting region 124 and rigid region 128. Integrally formed within the spring region 126 is a shock limiter 170 surrounded by a spring aperture 160. In this embodiment, the shock limiter 170 is also an elongated cantilevered portion connected to the spring region material at a proximal end 172, but includes a transverse cross-piece 176 at a distal end 174. The cross-piece 176 extends beyond the sides 177, 178 of the shock limiter 170, giving the limiter 170 a generally 'T' configuration.

The spring aperture 160 conforms in shape to the configuration of the shock limiter 170. In this embodiment, the spring aperture 160 includes an elongated portion 166 and a transverse opening 168 at the distal end 167 of the elongated portion 166, formed as a generally uniform gap around the perimeter of the Shock limiter 170. In addition, the spring aperture 160 also includes enlarged side openings 164 formed adjacent the proximal end 172 of the shock limiter 170. As described above, the size and shape of the spring aperture 160 may vary according to the spring force stiffness requirements of the head suspension 110.

In this embodiment, instead of utilizing a flexure (not shown) as the contact surface for the shock limiter 170, two transverse tab portions 127 formed by the configuration of the spring aperture 160 serve as the contact surface. In order to accomplish this, the shock limiter 170 is reconfigured, preferably by bending, to overlap these two tab portions 127. The shock limiter 170 is bent at form lines 181, 182 and 183 (shown in phantom) to produce a 'V' notch 179 perpendicular to the plane of the head suspension 110, best seen in FIG. 6. The effect of the 'V' notch 179 is to shorten the shock limiter 170, thus moving the cross-piece 176 over the two tab portions 127. FIG. 5 shows the resulting configuration of the shock limiter 170.

In the same manner as the embodiment described above a bend or radius 150 is formed in the spring region 126, and the shock limiter 170 is formed with a predetermined gap between the distal end 174 of the shock limiter 170 and the rigid region 128 of the load beam 120. When shock or impact loading causes the head suspension 110 to move away from the disk 16, the spring region 126 flexes and the rigid region 128 moves toward the shock limiter 170. The two tab portions 127 then contact the shock limiter cross-piece 176, arresting the movement of the head suspension 110 away from the disk 16. The lateral spacing of the tab portions 127 provides additional stability to the head suspension 110 when subjected to torsional shock loads.

Figure 7:
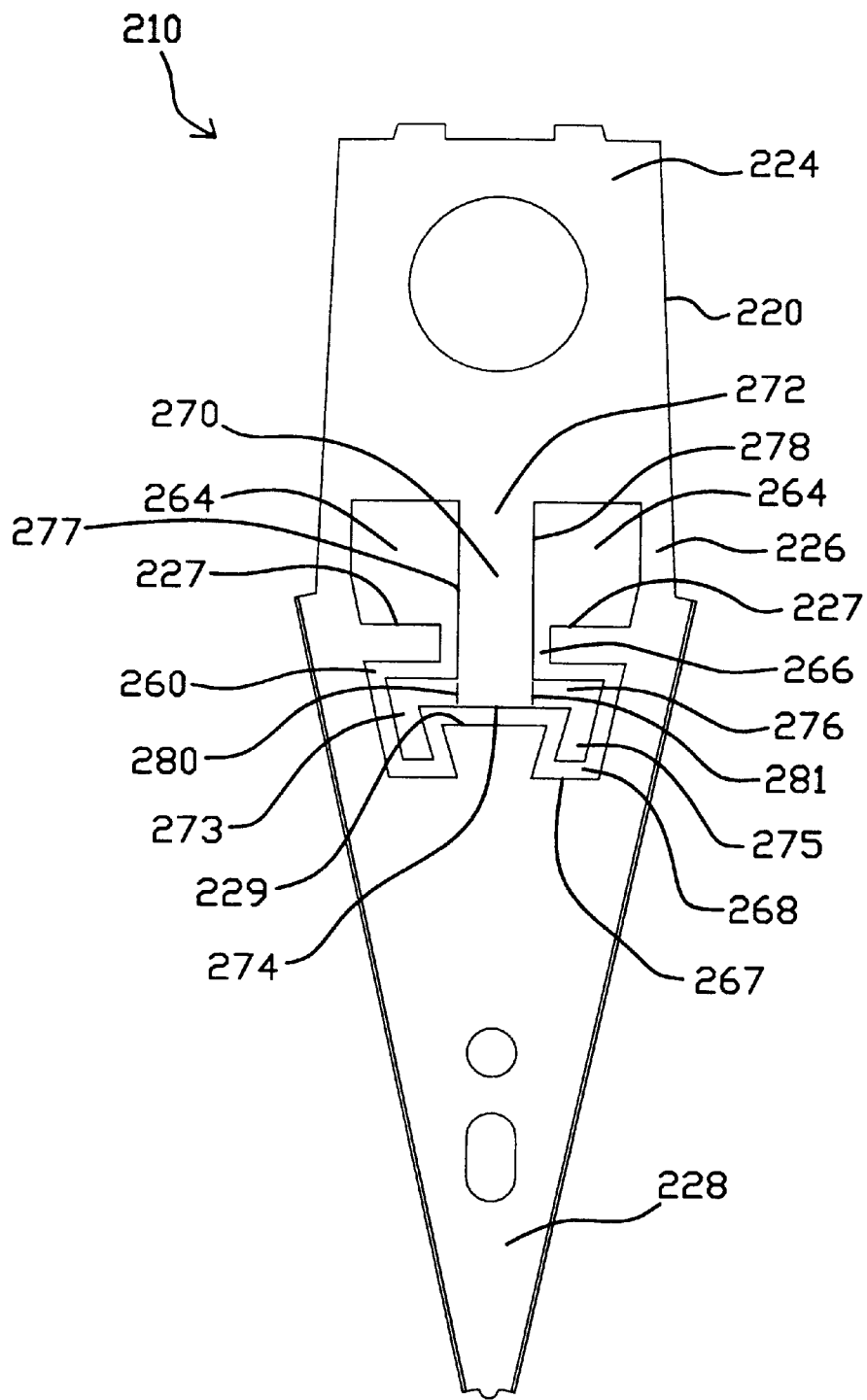
FIG. 7 is a top plan view of a head suspension including yet another embodiment of an integral shock limiter in accordance with the present invention.
Figure 8:
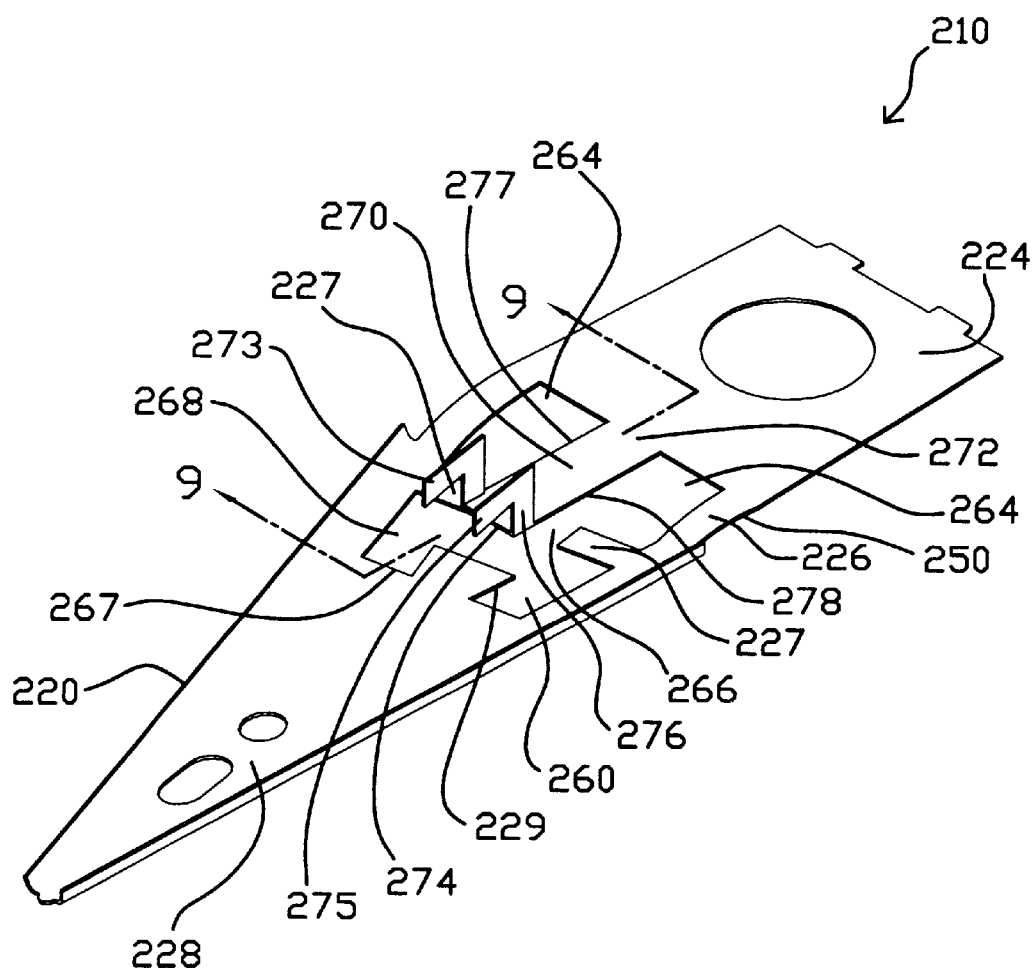
FIG. 8 is a perspective view of the head suspension of FIG. 7 after reconfiguration of the integral shock limiter.
Figure 9:
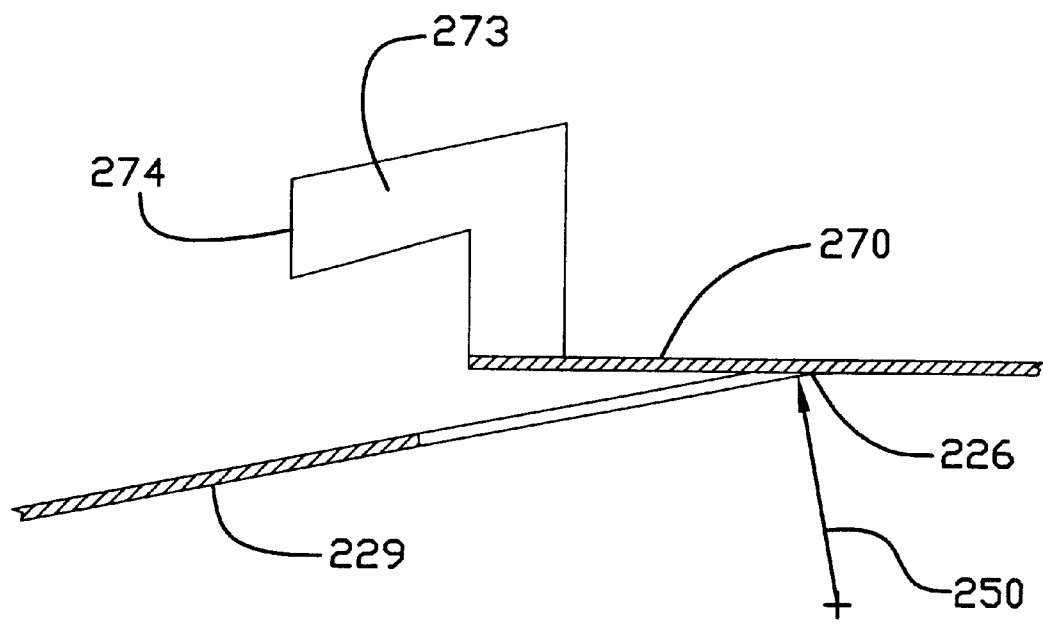
FIG. 9 is a cross-sectional side view of the head suspension of FIG. 8, taken along Line 9—9.

Referring now to FIGS. 7–9 In yet another embodiment of the present invention, a head suspension 210 is shown formed from a load beam 220 having a mounting region 224, a rigid region 228 and a spring region 226 located between the mounting region 224 and rigid region 228. Integrally formed within the spring region 226 is a shock limiter 270 surrounded by a spring aperture 260. In this embodiment, the shock limiter 270 is also an elongated cantilevered portion connected to the spring region material at a proximal end 272, but includes a transverse 'U' shaped cross-piece 276 at a distal end 274. The 'U' shaped cross-piece 276 extends beyond the sides 277, 278 of the shock limiter 270 with two 'L' shaped fingers 273 and 275, giving the limiter 270 a generally 'Y' configuration.

The spring aperture 260 also conforms in shape to the configuration of the shock limiter 270. In this embodiment, the spring aperture 260 includes a rectangular portion 266 and a 'U' shaped transverse opening 268 at the distal end 267 of the rectangular portion 266, formed as a generally uniform gap around the perimeter of the shock limiter 270. In addition, the spring aperture 260 also includes enlarged side openings 264 formed adjacent the proximal end 272 of the shock limiter 270. As described above, the size and shape of the spring aperture 260 may vary according to the spring force stiffness requirements of the head suspension 210. As a result of the configuration of the spring aperture 260, two side tabs 227 extend transversely into the spring aperture 260 and a distal tab 229 extends longitudinally into the spring aperture 260.

In this embodiment, the contact surface for the shock limiter 270 is the distal tab 229. In order to accomplish this, the shock limiter 270 is reconfigured, preferably by bending, to overlap this distal tab 229. The two 'L' shaped fingers 273, 275 are bent perpendicular to the shock limiter 270 away from the load beam 220 at form lines 280, 281 (shown in phantom). As a result, the two fingers 273, 275 overlap the distal tab 229. FIG. 8 shows the resulting configuration of the shock limiter 270.

In the same manner as the embodiments described above, a bend or radius 250 is formed in the spring region 226, and the shock limiter 270 is formed with a predetermined gap between the distal end 274 of the shock limiter 270 and the rigid region 228 of the load beam 220. When shock or impact loading causes the head suspension 210 to move away from the disk 16, the spring region 226 flexes and the rigid region 228 moves toward the shock limiter 270. The distal tab 229 then contacts the shock limiter fingers 273, 275, arresting the movement of the head suspension 210 away from the disk 16.

Figure 10:
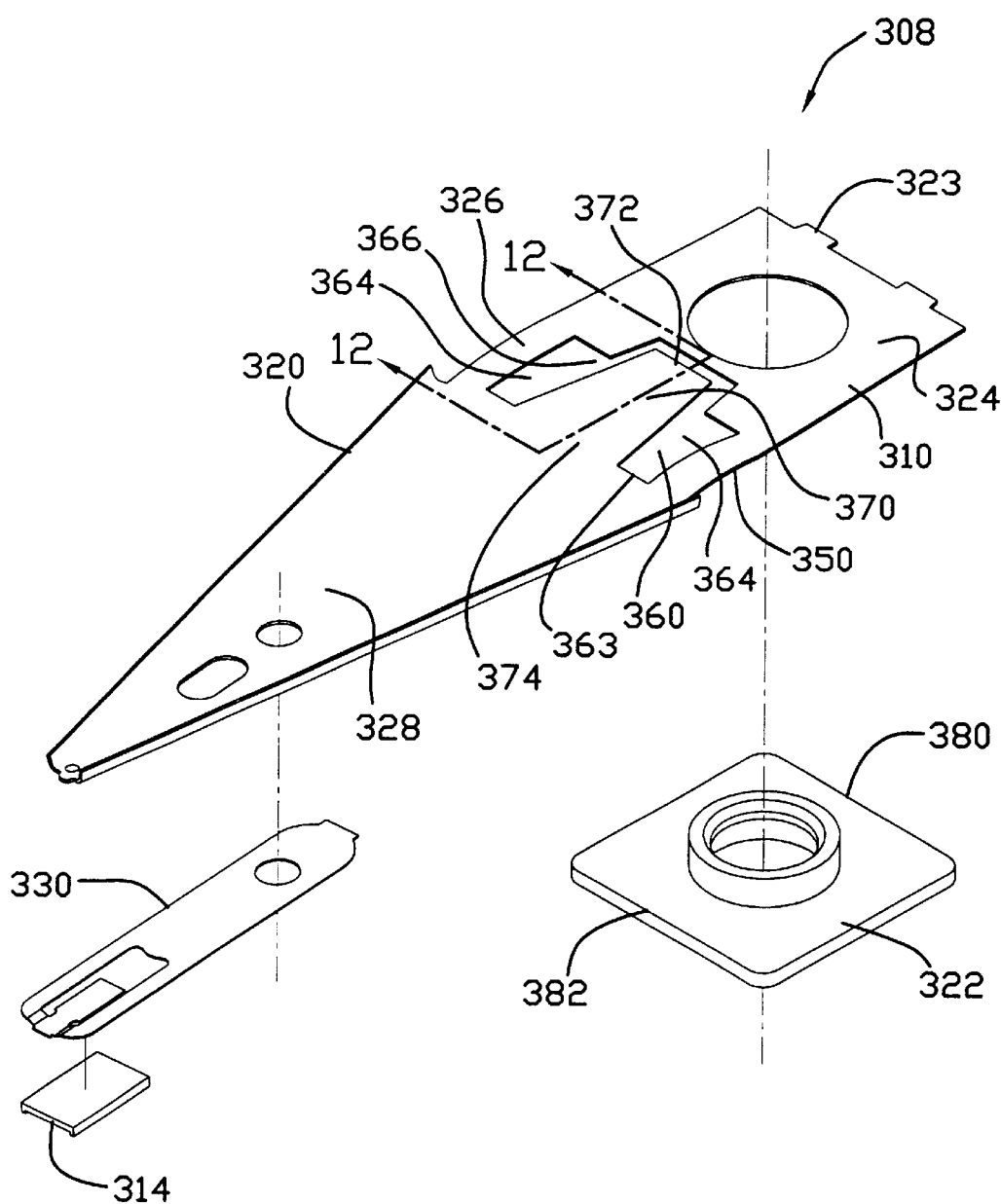
FIG. 10 is an exploded perspective view of a head suspension assembly, including another embodiment of a shock limiter in accordance with the present invention.
Figure 11:
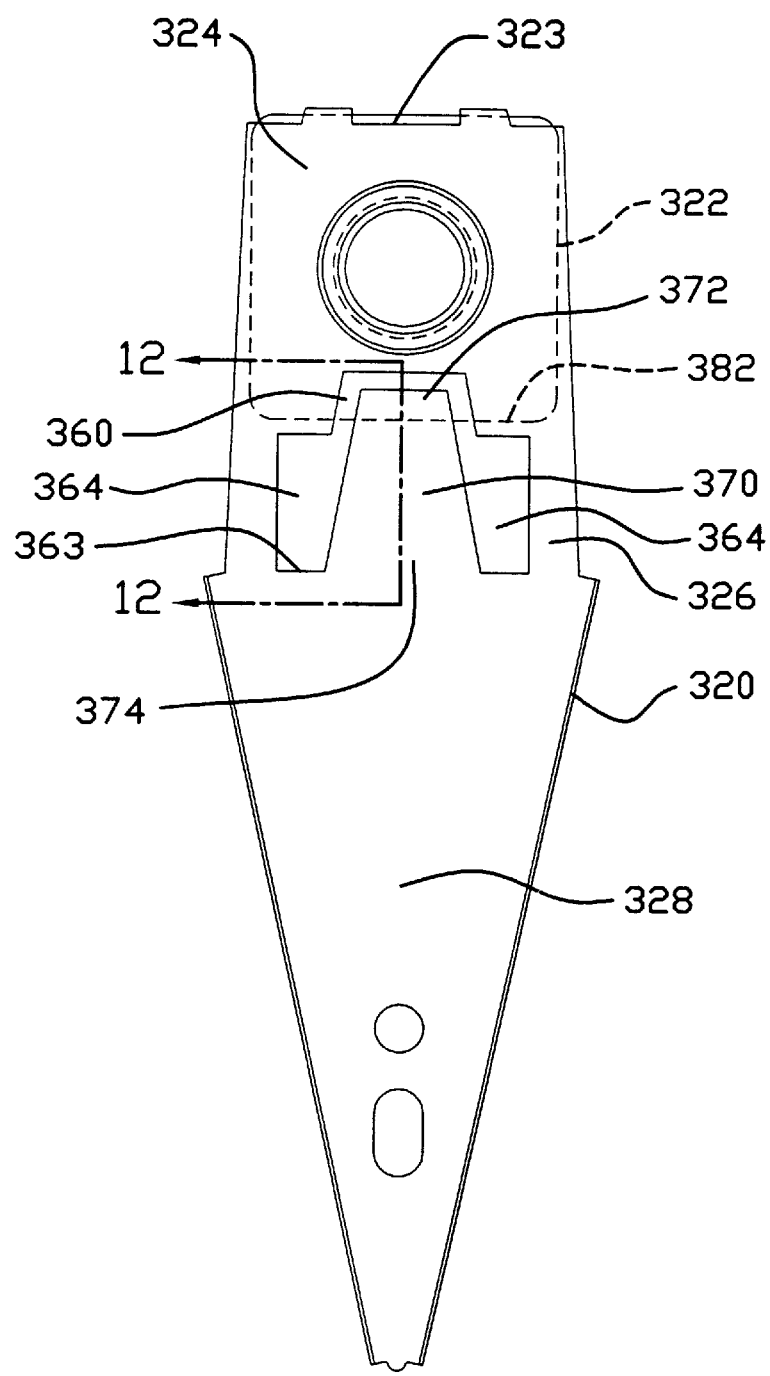
FIG. 11 is a top plan view of the head suspension shown in FIG. 10.
Figure 12:
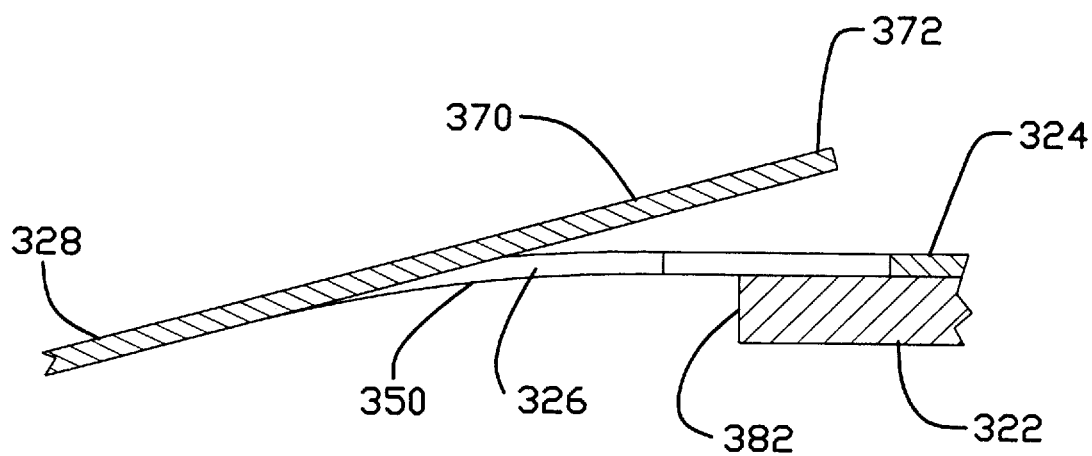
FIG. 12 is a cross-sectional side view of a portion of the head suspension of FIG. 11, taken along Line 12—12.

Referring now to FIGS. 10–12, in yet another embodiment of the present invention, a head suspension assembly 308 is shown. Head supension assembly 308 includes head suspension 310 in accordance with the present invention, slider 314, and a base plate 322. Head suspension 310 includes a load beam 320 and a flexure 330. Base plate 322 is shown mounting to an actuator mounting region 324 located at the proximal end 323 of the load beam 320 on the underside of the load beam 320. The base plate 322 includes a proximal edge 380 and a distal edge 392.

The load beam 320 is shown having a mounting region 324, a rigid region 328 and a spring region 326 located between the mounting region 324 and rigid region 328, as well as a spring aperture 360 formed within the spring region 326. Integrally formed in the spring aperture 360 within the spring region 326 is a shock limiter 370 configured as an elongated cantilevered portion extending from a distal edge 363 of the spring aperture 360. The shock limiter 370 connects to the spring region material at a distal end 374 and extends toward the proximal end 323 of the load beam 320 at a proximal end 372. As shown in FIG. 1, the proximal end 372 of the shock limiter 370 overlaps the distal edge 382 of the base plate 322.

the spring aperture 360 is formed around the shock limiter 370 in a generally 'U' shaped configuration. Since the spring aperture 360 is responsible for adjustment of the spring stiffness in the spring region 326, the size and shape of the spring aperture 360 around the shock limiter 370 may vary according to the spring force requirements of a particular head suspension 310. In the embodiment shown in FIGS. 10 and 11, the spring aperture 360 includes a pair of larger openings 364 flanking the distal end 374 of the shock limiter 370. The spring aperture 360 also includes an elongated portion 366 formed as a generally uniform tap around the sides and proximal end 372 of the shock limiter 370, overlapping a portion of the distal end 382 of the base plate 322, as well.

As shown in FIGS. 10 and 12, in a manner similar to the embodiments described above, a bend or radius 350 is formed in the spring region 326. The shock limiter 370 is configured to include a predetermined gap between the proximal end 372 of the shock limiter 370 and the mounting region 324 of the load beam 320, when the head suspension 310 is in an operating position. When a shock load causes the head suspension 310 to move away from the disk 16, the head suspension 310 flexes about the spring region 326 and he rigid region 328 of the load beam 320 also moves away from disk 16 resulting in the shock limiter 370 moving toward the mounting region 324. As the head suspension 310 moves farther away from the disk 16, the overlapped distal edge 382 of the base plate 322 contacts the shock limiter 370, thus arresting the movement of the head suspension 310, thereby minimizing the effects of the shock load induced movement.

Figure 13:
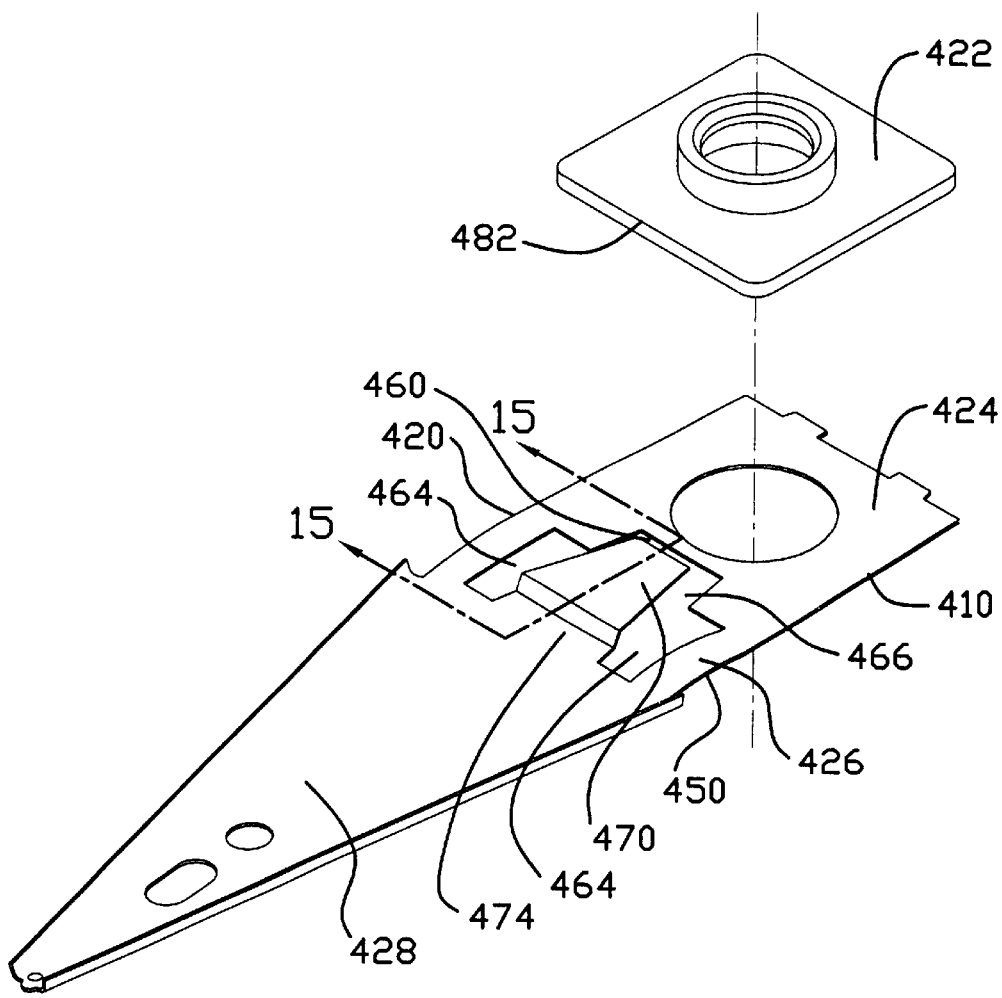
FIG. 13 is an exploded perspective view of a head suspension assembly, including yet another embodiment of a shock limiter in accordance with the present invention.
Figure 14:
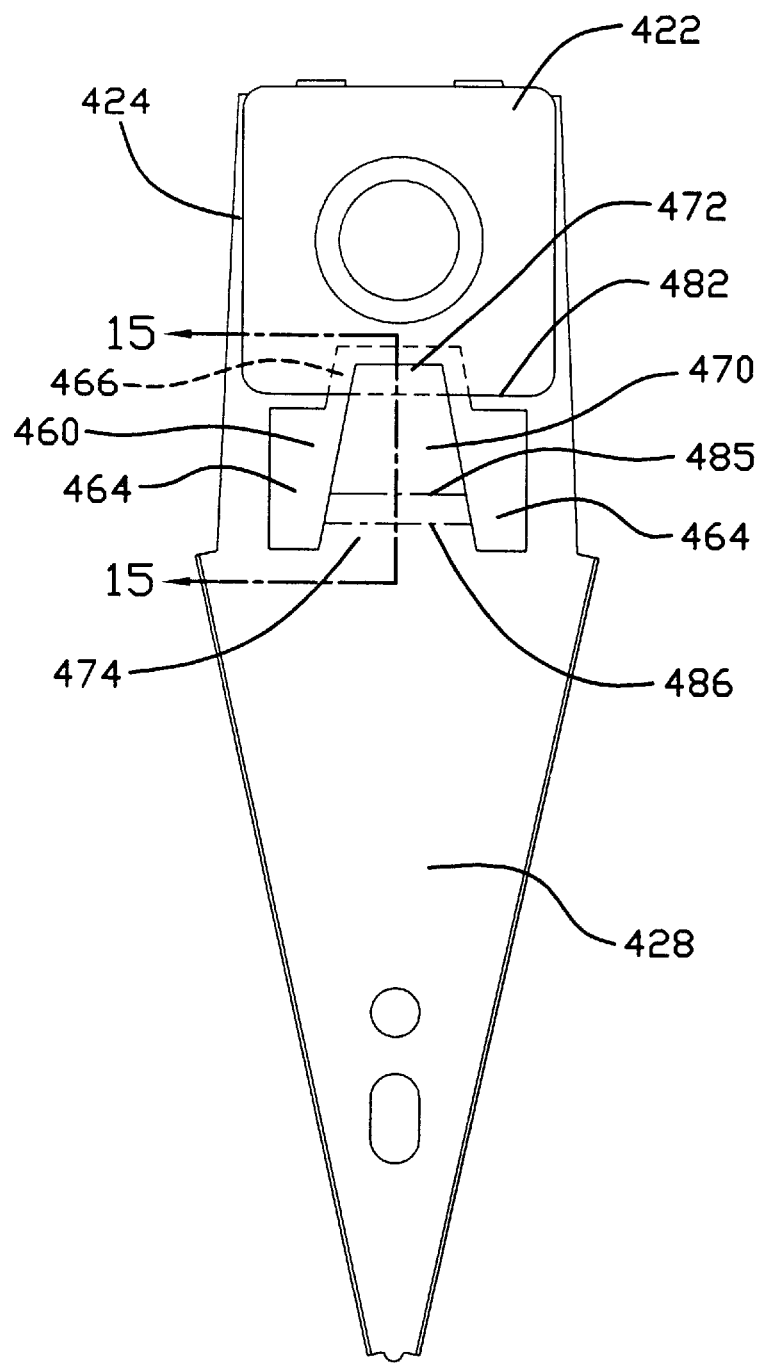
FIG. 14 is a top plan view of the head suspension shown in FIG. 13.
Figure 15:
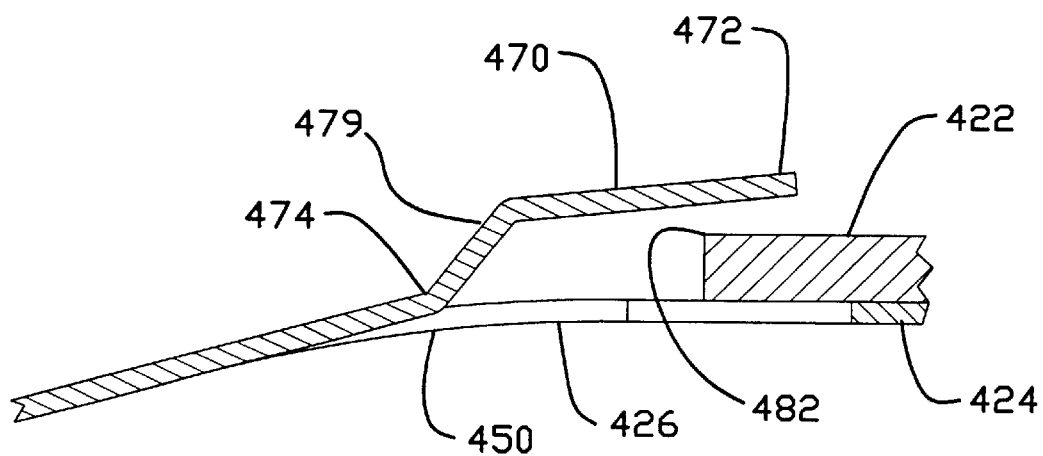
FIG. 15 is a cross-sectional side view of a portion of the head suspension of FIG. 14, taken along Line 15—15.

Referring now to FIGS. 13–15, in yet another embodiment of the present invention, a head suspension 410 is shown formed from a load beam 420 having a mounting region 424, a rigid region 428 and a spring region 426 located between the mounting region 424 and rigid region 428. Integrally formed within the spring region 426 is a shock limiter 470 surrounded by a spring aperture 460. In this enmbodiment, the shock limiter 470 is also an elongated cantilevered portion connected to the spring region material at a distal end 474.

The spring aperture 460 conforms in shape to the configuration of the shock limiter 470. The spring aperture 460 includes an elongated portion 466 formed as a generally uniform gap around the perimeter of the shock limiter 470 and enlarged site openings 464 formed adjacent the distal end 474 of the shock limiter 470. As described above, the size and shape of the spring aperture 460 may vary according to the spring force stiffness requirements of the head suspension 410.

In this embodiments, instead of mounting a base plate 422 to the mounting region 424 of the load beam 420 on the underside, the base plate 422 is mounted in a similar manner to the topside of the load beam 420, as shown in FIG. 13. In order utilize the base plate 422 as the contact surface for the shock limiter 470, the shock limiter 470 is reconfigured, preferably by bending, to overlap the distal edge 482 of the base plate 422. The shock limiter 470 is bent at form lines 485 and 486 (shown in phantom in FIG. 14) to produce an offset 479 transverse to the plane of the head suspension 410, best seen in FIG. 15. The effect of the offset 479 is to lift the shock limiter 470 above the base plate 422. FIG. 13 shows the resulting configuration of the shock limiter 470.

In the same manner as the embodiments described above, a bend or radius 450 is formed in the spring region 426, and the shock limiter 470 is formed with a predetermined gap between the proximal end 472 of the shock limiter 470 and the base plate 422. When shock or Impact loading causes the head suspension 410 to move away from the disk 16, the spring region 426 flexes and the rigid region 428 also moves away from disk 16 resulting in movement of the shock limiter 470 toward the mounting region 424. The proximal end 472 of the shock limiter 470 then contacts the base plate 422, arresting the movement of the head suspension 410 away from the disk 16.

As would be apparent to one skilled in the art, other suitable integral shock limiters may be formed within the spring region of the load beam and other portions of the head suspension used as contact surfaces to achieve the same results as those embodiments described above. It Is to be understood that such shock limiters are within the spirit and scope of the present invention.

A shock limiter, as described in the embodiments above, may be formed from the spring region of the load beam using fabrication methods generally known in the art. These fabrication methods include, but are not limited to, etching, stamping, and machining. Since the shock limiter may be formed simultaneously with the spring aperture, the same fabrication methods used for the spring aperture may also be used for the shock limiter.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A head suspension for supporting a head slider over a disk surface in a rigid disk drive, the head suspension including a load beam having a mounting region, a rigid region and a spring region located between the mounting region and rigid region, the head suspension further including a flexure at a distal end of the load beam, the head suspension comprising a shock limiter formed of the same piece of material as the spring region of the load beam without bends in the shock limiter and wherein the shock limiter limits movement of the rigid region with respect to the mounting region due to impact loading.

2. The head suspension of claim 1, wherein the spring region of the load beam includes an opening, and wherein the shock limiter comprises a cantilevered portion formed within the opening.

3. The head suspension of claim 2, wherein the shock limiter overlaps a portion of the head suspension and the shock limiter contacts the overlapped portion of the head suspension upon movement of the head suspension away from the disk surface.

4. The head suspension of claim 3, wherein the head suspension includes a flexure and the overlapped portion of the head suspension comprises a portion of the flexure.

5. The head suspension of claim 3, wherein the head suspension includes a base plate attached to the load beam at the mounting region, and the overlapped portion of the head suspension comprises a portion of the base plate.

6. The head suspension of claim 1 wherein the shock limiter limits movement of the rigid region of the load beam away from the disk surface due to impact loading.

7. A load beam for a head suspension that supports a head slider over a disk surface in a rigid disk drive, the load beam comprising a single piece of material including:
   a mounting region;
   a rigid region;
   a spring region located between the mounting and rigid regions; and
   a shock limiter free of bends and limiting movement of the rigid region with respect to the mounting region due to impact loading.

8. The load beam of claim 7, wherein the spring region includes an opening and wherein the shock limiter comprises a cantilevered portion formed within the opening.

9. The load beam of claim 7 wherein the shock limiter limits movement of the rigid region of the load beam in a direction away from the disk surface due to impact loading.

* * * * *